(12) United States Patent
Knoedler et al.

(10) Patent No.: US 6,813,015 B2
(45) Date of Patent: Nov. 2, 2004

(54) ADJUSTING DEVICE WITH AN OPTICAL REGULATING DEVICE HAVING A REFLECTOR

(75) Inventors: Juergen Knoedler, Remshalden (DE); Peter Roehr, deceased, late of Denkendorf (DE); by Christian Roehr, legal representative, Denkendorf (DE); by Patrick Roehr, legal representative, Denkendorf (DE); by Karin Roehr, legal representative, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,016

(22) PCT Filed: Jan. 17, 2001

(86) PCT No.: PCT/DE01/00166

§ 371 (c)(1),
(2), (4) Date: Sep. 25, 2003

(87) PCT Pub. No.: WO01/88464

PCT Pub. Date: Nov. 22, 2001

(65) Prior Publication Data

US 2004/0165174 A1 Aug. 26, 2004

(30) Foreign Application Priority Data

May 12, 2000 (DE) .......................................... 100 23 328

(51) Int. Cl.⁷ ............................................... G01B 11/26
(52) U.S. Cl. ..................................................... 356/155
(58) Field of Search ................................ 356/154, 155, 356/399, 400, 140, 141, 141.2

(56) References Cited

U.S. PATENT DOCUMENTS

| | | | | |
|---|---|---|---|---|
| 3,951,551 A | | 4/1976 | Macpherson | |
| 4,095,902 A | * | 6/1978 | Florer et al. | 356/155 |
| 4,134,680 A | * | 1/1979 | Hunter et al. | 356/121 |
| 4,249,824 A | * | 2/1981 | Wiederrich et al. | 356/155 |
| 4,444,496 A | * | 4/1984 | Dale, Jr. | 356/155 |
| 4,615,618 A | * | 10/1986 | Bailey et al. | 356/139.09 |
| 4,764,010 A | | 8/1988 | Bachmann et al. | |
| 4,827,623 A | | 5/1989 | Goodell | |

FOREIGN PATENT DOCUMENTS

DE            28 31 615            1/1981

\* cited by examiner

Primary Examiner—Michael P. Stafira
(74) Attorney, Agent, or Firm—Kenyon & Kenyon

(57) ABSTRACT

The present invention relates to an adjusting apparatus having an optical aimer that includes a reflector for adjusting parts of a motor vehicle, in particular distance warning radar, headlights, or an axle; having an emitting device that emits a collimated beam; and having a vertical adjusting device for orienting the reflector at a certain angle to a floor of a measuring station forming the contact plane of the vehicle. An exact vertical alignment or orientation at a certain tilt angle to the floor of the measuring station is achieved by simple measures, in that the emitting device is positioned in a vehicle region remote from the aimer, at a specific, defined level of the vehicle above the measuring-station floor and may be adjusted for emitting the beam at different elevation angles relative to a line parallel to the measuring-station floor, and the vertical adjusting device has a diaphragm unit, which is situated between the aimer and the emitting device and has a vertically adjustable diaphragm, whose level is adjustable in such a manner that the beam directed at the reflector and passing through the diaphragm passes through it again after being reflected at the reflector.

4 Claims, 2 Drawing Sheets

ADJUSTING DEVICE WITH AN OPTICAL REGULATING DEVICE HAVING A REFLECTOR

FIELD OF THE INVENTION

The present invention relates to an adjusting apparatus having an optical aimer that possesses a reflector for adjusting park of a motor vehicle, in particular distance warning radar, headlights, or an axle; having an emitting device that emits a collimated beam, and having a vertical adjusting device for aligning the reflector at a certain angle to a floor of a measuring station forming the contact plane of the vehicle.

BACKGROUND INFORMATION

German Published Patent Application No. 197 07 590 describes an adjusting apparatus for adjusting distance warning radar, a headlight, or parameters linked to an axle of a motor vehicle, this adjusting apparatus providing for an aimer having a reflector for light or electromagnetic radiation being positioned in front of the vehicle, e.g. for adjusting the headlight or distance warning radar, in order to use this to set the headlight or the distance warning radar exactly according to corresponding requirements. To this end, the reflector of the aimer must initially be oriented, e.g. exactly at a right angle to an axis of travel of the vehicle. For this purpose, the reflector, preferably a mirror that is appropriately coated to reflect radar waves, may be set at different horizontal and vertical angles. In order to align the aimer with the vehicle, an adjusting mirror, by which a line of sight is made to coincide with suitable reference points of the motor vehicle, is attached to the aimer. In particular, the adjustment of distance warning radar requires that the reflector be exactly perpendicular to the contact plane of the vehicle or the floor of the measuring station, the maximum tolerance being, for example, +/−0.2°. Such vertical adjustment accuracy of the reflector is difficult to attain.

An attempt to make the floor of a measuring station suitably level has been made, in order to subsequently orient the reflector in the vertical direction. However, it is, in practice, very expensive and difficult to attain such evenness and quality of the measuring-station floor.

SUMMARY OF THE INVENTION

An object of the present invention is to provide an adjusting apparatus of the type mentioned at the outset, which allows the reflector to be accurately aligned at a certain tilt angle to the floor of the measuring station and, in particular, also allows it to be accurately aligned in the vertical direction with respect to the floor of the measuring station, in as simple and attainable a manner as possible.

According to the present invention, it is provided that the emitting device be positioned in a vehicle region remote from the aimer, at a particular, defined height of the vehicle above the floor of the measuring station, and be adjustable in order to emit the beam at different elevation angles with respect to a line parallel to the measuring-station floor; and that the vertical adjusting device have a diaphragm unit positioned between the aimer and the emitting device, the diaphragm unit having a vertically adjustable diaphragm, whose level is adjustable in such a manner that the beam directed towards the reflector and passing through the diaphragm passes through it again after being reflected at the reflector.

These measures allow the tilt angle of the reflector to be adjusted to be exactly perpendicular to the incident beam, and thus, adjusted in a selective manner. If, for example, the emitting device is secured in position with respect to a rear wheel, at the level of its axle, and the diaphragm is adjusted to a corresponding level and positioned next to the front wheel on the same side of the vehicle, while the aimer having the reflector is positioned laterally in front of the vehicle, as an extension of the line from the emitting device through the diaphragm, then the angle of the reflector with respect to the floor of the measuring station is exactly 90°, when the beam reflected by the reflector travels through the diaphragm. In this connection, the width of the diaphragm aperture approximately corresponds to the diameter of the collimated beam.

Simple handling with a simple design of the adjusting apparatus is obtained by supporting the reflector at a support of the aimer, so as to swivel about a horizontal axis, attaching the emitting device to a vehicle wheel as an extension of a wheel axis, with the aid of a holding device, and positioning the diaphragm next to a further wheel, on a support standing up on the floor of the measuring station, so as to be displaceable and securable in an adjusting position.

Simple and definite adjustability is achieved in that the diaphragm is a slit diaphragm running horizontally, and the emitting device is a laser unit. In this context, the horizontal slit diaphragm and the laser beam simplify the adjustment.

An embodiment that is favorable for the design and handling provides for the diaphragm being formed in an essentially rectangular plate having at least two parallel, vertical guideways spaced apart from each other and a clamping screw guided in a vertical slot.

DETAILED DESCRIPTION

Figure 1:
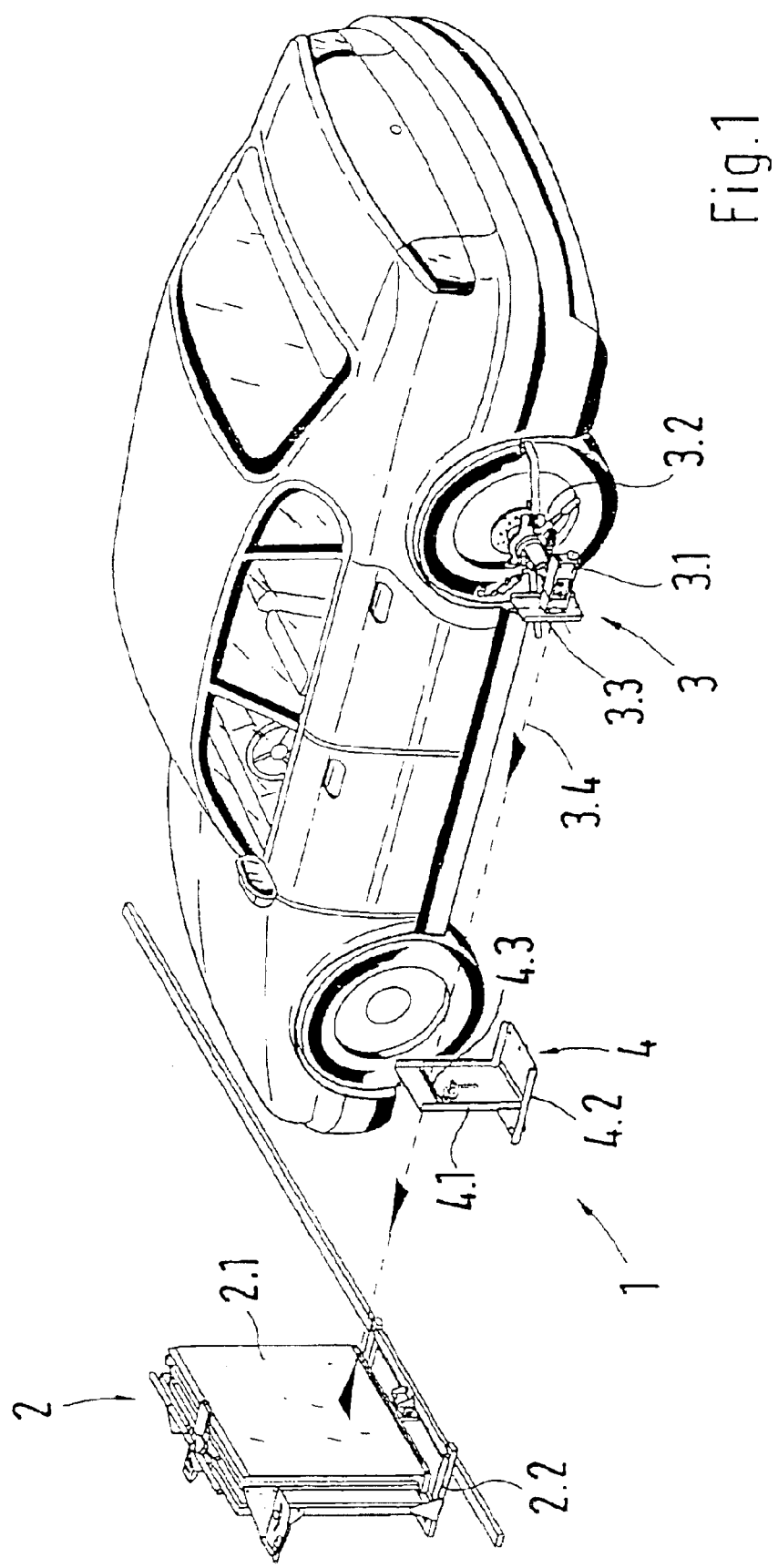
FIG. 1 shows a perspective view of an adjusting apparatus with a motor vehicle positioned on the floor of a measuring station.

FIG. 1 shows a motor vehicle positioned on the floor of a testing station, a vertical adjusting device being situated at the side of the motor vehicle for adjusting a reflector 2.1 of an aimer 2. A beam-generation unit 3.1 taking the form of a laser unit (laser pointer) is mounted on the rear wheel as an extension of the wheel axis, using a holding device 3.2 that is, e.g. in the form of a quick-acting clamping support. Emerging from an outlet plane 3.3 situated on the front of beam-generation unit 3.1 is a beam 3.4, which travels through a diaphragm 4.1 of a diaphragm unit 4 and strikes reflector 2.1, and when reflector 2.1 is aligned vertically, the beam is reflected again as a reflected beam 3.5, through the diaphragm 4.1 taking the form of a slit diaphragm. These interrelationships are schematically represented in FIGS. 2 and 3.

The reflector is supported on a support 2.2 set up, e.g. on the floor of a measuring station or attached to the ceiling of a measuring space, so as to be tiltable about a horizontal axis. For example, in order to adjust distance-warning radar, reflector 2.1 is preferably made of a mirror, which is coated with a coating suitable for reflecting the radar waves during the adjustment of the distance-warning radar.

The diaphragm unit 4 situated next to the front wheel has an approximately rectangular plate, which is angular at the sides and has horizontal slit diaphragm 4.1. The plate is supported on a support 4.2 set up on floor 5 of a measuring station, so as to be able to slide vertically, and may be clamped by a clamping screw that is guided in a vertical slot. Aperture 4.3 of the slit diaphragm has a width which approximately corresponds to the diameter of the laser beam or is somewhat greater than the beam diameter.

Figure 2:
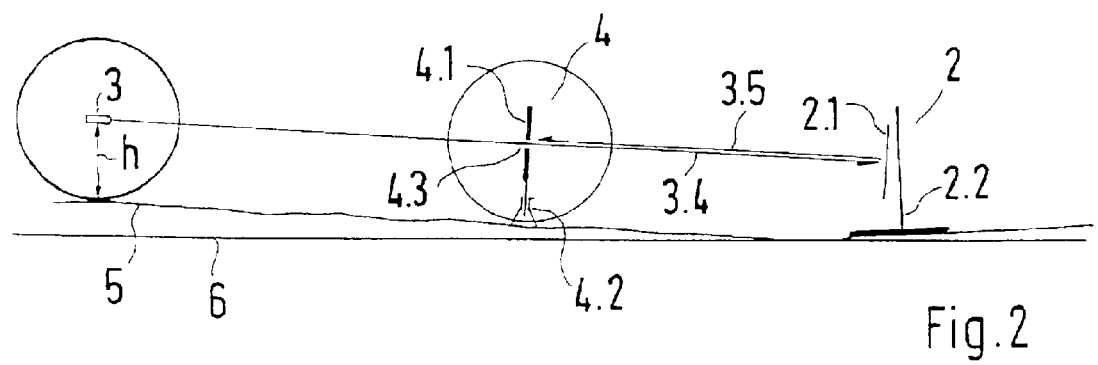
FIG. 2 shows a schematic side view of the set-up of the adjusting apparatus.
Figure 3:
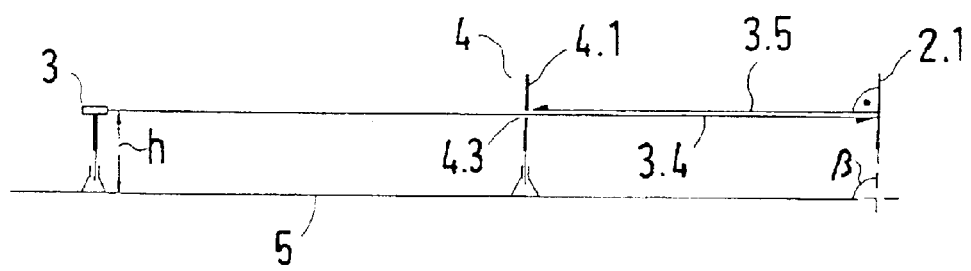
FIG. 3 shows a further, schematic side view of the set-up of the adjusting apparatus.

If the level of aperture 4.3 of diaphragm 4.1 corresponds to the level of beam-generation unit 3.1, then beam 3.4 travels parallelly to measuring-station floor 5, which may be inclined with respect to a horizontal line 6, as shown by FIG. 2. If the alignment of reflector 2.1 is such that reflected beam 3.5 passes through aperture 4.3 of diaphragm 4.1, then reflector 2.1 is exactly perpendicular to the contact plane of the vehicle, a tolerance of +/−0.1° due to the relatively long distance of reflector 2.1 from diaphragm unit 4 and emitting device 3 being easily adhered to. It is also possible to set other tilt angles of reflector 2.1, when the levels h of emitting device 3 and aperture 4.3 of diaphragm unit 4 above the measuring-station floor are different.

The advantage of attaching emitting device 3 to a wheel of the nonsteerable vehicle axle, normally the rear axle, is that the same holding device 3.2 and the same emitting device 3 may be used as are also used for ascertaining an axis of travel.

The procedure for adjustment is, for example, as follows: at a rear wheel, aperture 4.3, which is in the form of the slit of diaphragm unit 4, is set to the level of the laser unit. Diaphragm 4.1 is then positioned next to the front wheel. Using swivelling emitting device 3, the laser beam is adjusted so that it travels through the slit of diaphragm 4.1 and is reflected onto diaphragm 4.1 by reflector 2.1. Reflector 2.1 is then adjusted until the laser beam is reflected through the slit of diaphragm 4.1. Reflector 2.1 is then oriented exactly perpendicularly to the contact plane of the vehicle. The level h of the slit above measuring-station floor 5 may also be set, for example, using a ruler.

What is claimed is:

1. An adjusting apparatus, comprising:
   an optical aimer including a reflector for adjusting a part of a vehicle;
   an emitting device that emits a collimated beam; and
   a vertical adjusting device for orienting the reflector at a certain angle to a floor of a measuring station forming a contact plane of the vehicle, wherein:
   the emitting device is positioned in a vehicle region remote from the optical aimer, at a specific, defined level of the vehicle above the measuring-station floor and is capable of being adjusted for emitting the collimated beam at different elevation angles relative to a line parallel to the measuring-station floor, and
   the vertical adjusting device includes a diaphragm unit situated between the optical aimer and the emitting device, the diaphragm unit including a vertically-adjustable diaphragm whose level may be adjusted such that the collimated beam directed at the reflector and passing through the vertically-adjustable diaphragm passes through the vertically-adjustable diaphragm again after being reflected at the reflector.

2. The adjusting apparatus as recited in claim 1, wherein: the part includes one of a distance warning radar, a headlight, and an axle.

3. The adjusting apparatus as recited in claim 1, wherein: the reflector is supported on a support of the optical aimer, so as to be able to swivel about a horizontal axis,
   the emitting device is attached to a vehicle wheel as an extension of a wheel axis, using a holding device, and
   the vertically-adjustable diaphragm is positioned next to a further wheel, on another support standing up on the measuring-station floor, so as to be displaceable and securable in an adjusting position.

4. The adjusting apparatus as recited in claim 3, wherein: the vertically-adjustable diaphragm includes a horizontally running, slit diaphragm, and
   the emitting device includes a laser unit.

* * * * *